July 9, 1968  J. R. ZIMMERMAN, JR  3,392,327
DETECTION OF ELECTROSEISMIC SIGNALS EMPLOYING SALT DOMES
Filed Sept. 30, 1964
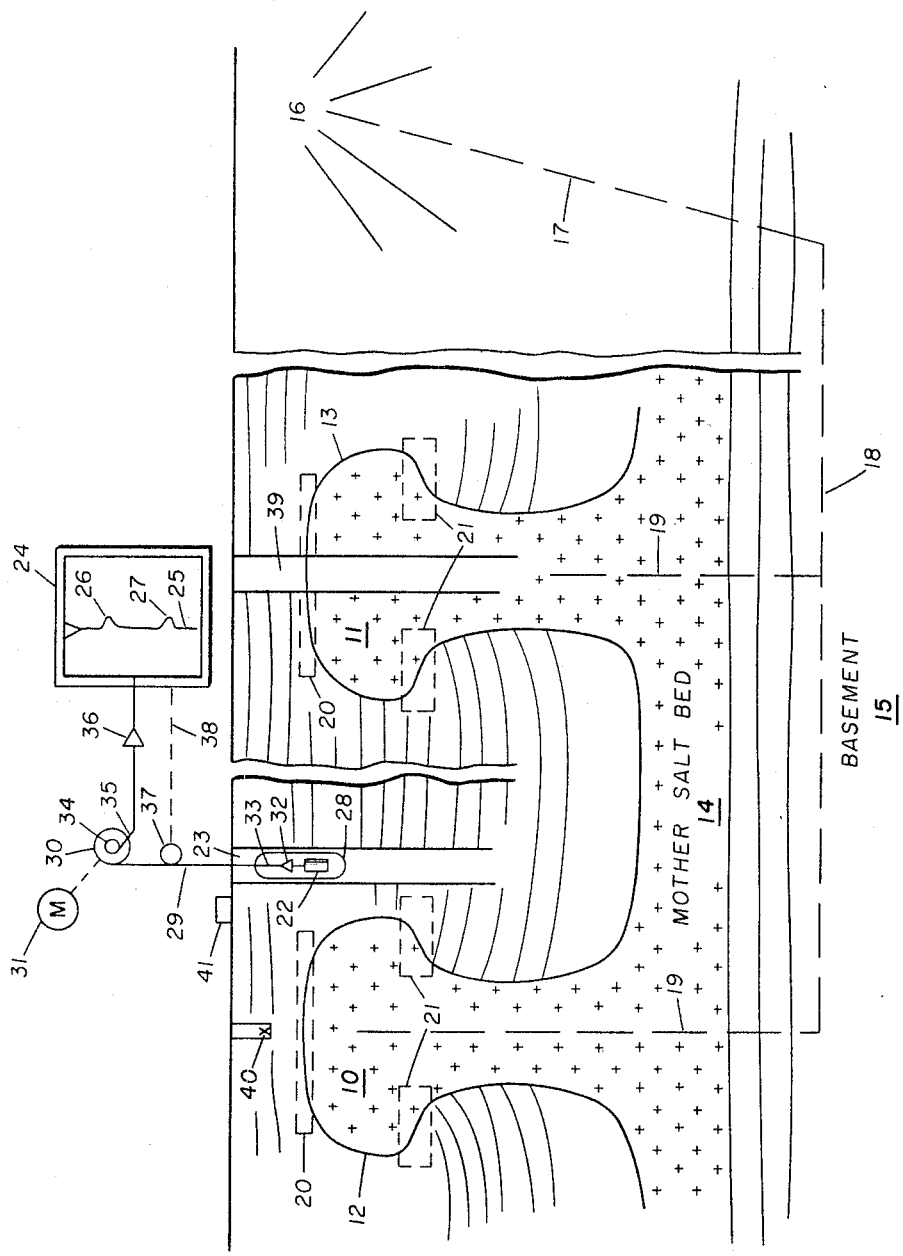
JOHN R. ZIMMERMAN, JR.
INVENTOR.
BY *Arthur F. Zobal*
ATTORNEY 12
United States Patent Office 3,392,327
Patented July 9, 1968

3,392,327
DETECTION OF ELECTROSEIMIC SIGNALS EMPLOYING SALT DOMES
John R. Zimmerman, Jr., Dallas, Tex., assignor to Mobil Oil Corporation, a corporation of New York
Filed Sept. 30, 1964, Ser. No. 400,378
8 Claims. (Cl. 324—1)

This invention relates to the measurement of electromagnetic signals resulting from seismic disturbances of subsurface formations and more particularly to the measurement of electromagnetic signals in the vicinity of salt domes to obtain useful information.

As has been reported in the literature, certain subsurface environments may convert seismic energy into electromagnetic signals by the electroseismic effect. The conversion is dependent upon a number of factors including contrasts in permeability-porosity, viscosity of the fluids, conductivity of the formations, the pressure gradient developed by the seismic energy, and the electrokinetic potential characteristics at the interfaces of the distinguishing media.

In accordance with the present invention, electromagnetic signals generated at the region of the interface between salt domes and subsurface formations are measured to obtain information, useful, for example, in the search for petroleum or in the detection of acoustic disturbances arising from distant energy sources.

More particularly, salt domes appear to possess certain characteristics which are ideal for converting seismic energy to electromagnetic energy. For example, salt domes represent, at seismic frequencies, a large inertial frame capable of transmitting acoustic energy over long distances. These domes are thought to extend upwardly from a mother salt bed which lies deep in the subsurface formations in the vicinity of the basement rock of the earth's crust. Thus, salt domes appear to be coupled acoustically to the basement rock. Furthermore, the domes exhibit continual motion having a strong vertical component due to seismic energy transmitted vertically into the dome, from distant energy sources, by way of the lower basement rock.

Since there is a large contrast in permeability-porosity and electrical characteristics between the domes and adjacent subsurface formations, the interface regions are ideal for converting seismic energy, for example, transmitted from the basement rock, into electromagnetic energy.

The domes, furthermore, have a unique geometry which allows the electric and magnetic fields of the associated electromagnetic wave generated to be broken into their various components, thereby facilitating measurement. More particularly, salt domes generally have large laterally extending overhang sections whereby large horizontal interface regions exist between the top of the salt domes and overlying subsurface formations and between the underside of the overhang section and lower subsurface formations. The vertical component of motion applied to the horizontal interface regions is expected to produce a strong electromagnetic signal having an electric field component in the vertical direction and a magnetic field component in the horizontal direction. Thus, by detecting in the plane of the horizontal interface, one may obtain a strong directional signal traveling in that plane and containing useful information.

In accordance with one aspect of the present invention, electromagnetic signals generated at the interface region between a salt dome and subsurface formations are measured to locate the plane of the interface.

In a more specific aspect, the horizontal interface regions defining the overhang portions are located in correlation with depth by measuring electromagnetic signals at a plurality of depths in a borehole spaced laterally from the salt dome. The location of the horizontal overhang interface is of particular importance in geophysical exploration as an aid in determining depth at which one expects to drill through the overhang into lower inclined formations which provide potential traps for oil.

In a further aspect of the present invention, electromagnetic signals generated at the interface region between the salt dome and adjacent subsurface formations are measured at a fixed location to detect acoustic disturbances arising from distant energy sources of large magnitude. In one embodiment, this technique has special application in the detection of nuclear blasts, for example, originating underground at distant points. Due to the ideal characteristics of salt domes, as mentioned above, the measurement of electromagnetic signals generated at the horizontal interface region of salt domes is expected to provide an improved technique for detecting distant nuclear blasts. As reported in "Field Experiments on the Electroseismic Effect" by R. A. Broding et al., IEEE Transactions on Geoscience Electronics, December 1963, pp. 23–31, attempts have been made to detect nuclear blasts by techniques based on the electroseismic effect; however, difficulties have been experienced due to the inability of the environment tested of efficiently converting seismic energy to electromagnetic energy.

For a more complete understanding of the present invention and for further advantages thereof, reference may now be had to the following detailed description taken in conjunction with the accompanying drawing, wherein:

FIGURE 1 represents, in part, salt dome regions wherein the present invention is carried out.

As illustrated in FIGURE 1, two salt domes 10 and 11 are shown respectively having overhang sections 12 and 13. The salt domes are large structures which may be spaced apart by distances of the order of miles and which extend upwardly from a mother salt bed 14 overlying the basement rock 15. It is thought that the mother salt bed lies close to the basement rock and thus is coupled acoustically to the basement rock, at least in a seismic frequency range. In addition, both the basement rock and the salt domes are good carriers of acoustic signals in a seismic frequency range. Thus, disturbances in the earth, occurring for example at 16, generate acoustic signals which are transmitted to the underlying basement rock by way of a path illustrated at 17. These signals are transmitted through the basement rock by way of a path illustrated at 18, and up into the salt domes by way of paths illustrated at 19.

Generally, disturbances in the earth occur continuously whereby salt domes exhibit continual motion. Furthermore, since the acoustic energy applied to the salt domes is transmitted generally vertically from the basement rock, the salt domes exhibit a strong vertical component of motion. This vertical component of motion, when applied to the horizontal interface regions, illustrated at 20 and 21, results in the generation of electromagnetic signals having an electric field component in the vertical direction and a magnetic field component in the horizontal direction. The strongest signal thus will be in a plane perpendicular to the plane defined by the electric and magnetic field components.

In one embodiment of the present invention, these signals are measured to define the overhang portions of the salt domes. As mentioned previously, the location of the depth of the overhang sections is important in carrying drilling operations. To locate the overhang sections in correlation with depth, a detector 22, of electromagnetic signals, preferably is employed to traverse a borehole 23 drilled at a point spaced from the salt dome. The output of the detector employed is applied to the surface to a recorder 24 for the production of a trace 25 in correlation with depth. As the detector 22 traverses the borehole and reaches the level of the interface regions 20 and 21, the detector will produce an increase in signal amplitude which will reflect the depth of the interface regions. The increase in signal amplitude is recorded by trace 25 as at points 26 and 27.

The detector employed preferably is a magnetometer for detecting the magnetic field component; however, a di-pole detector may be employed for detecting the electric field component. The magnetic or electric field detectors employed are directionally oriented to measure respectively the horizontal magnetic field component or the vertical electric field component. Since the strongest signal is expected to be in a plane perpendicular to the plane of the electric and magnetic fields, a plurality of boreholes (not shown) preferably are drilled at points spaced around the dome for measurement purposes.

In the embodiment illustrated, the detector 22 is contained in a borehole tool 28 supported by cable 29. The cable in turn is wound and unwound upon drum 30 driven by motor 31. The output of the detector 22 is applied to surface by way of amplifier 32 and conductor 33 of cable 29. At the surface, signals are taken from conductor 33 by way of slip ring 34, brush 35 and applied to recorder 24 by way of amplifier 36. The chart of the recorder is driven in correlation with depth by sheave 37 and connection 38.

As an alternative to the above, the borehole may be drilled into the dome, as illustrated at 39 in dome 11, whereby only the lower interface regions 21 need be measured by the technique of the present invention.

As a further alternative, explosives placed at desirable locations in the subsurface formations near the vicinity of the salt domes may be detonated to initiate the generation of the electromagnetic energy at certain interface regions. For example, in measurements carried out in conjunction with dome 10, explosives may be detonated at shot point 40 to impart acoustic energy to the horizontal interface 20. In this embodiment, the detector is moved point by point to different depths in the borehole 23 to obtain a measurement for each detonation.

In a further embodiment of the present invention, the first arrangement described above and employing borehole 23 may be employed to detect distant energy sources of large magnitudes, for example, due to nuclear blasts originating at point 16. In the preferred embodiment, the depth of the horizontal interface region 20 is determined from drilling operations, and the detector 22 is located fixedly in the borehole 23 at that depth to detect electromagnetic signals generated at the region 20 and resulting from distant acoustic disturbances. A nuclear blast may be detected by an increase in signal strength as reflected by the trace 25. By comparing the signals recorded during normal circumstances, analysis can be made to determine whether the increase in signal is due to large and unusual disturbances suspected to occur from nuclear blasts. In the detection of nuclear blasts, a plurality of boreholes 23 spaced from the dome may be drilled for measurement purposes to obtain a location of optimum signal as can now be apparent from the prior discussion.

It is to be understood that in the embodiments described above, a plurality of detectors may be employed in the boreholes to measure a plurality of components each of the electric and magnetic field. Like measurements may also be obtained in boreholes drilled within the salt dome. In addition, similar measurements may be made at the surface as at position 41 to obtain background signals due, for example, to electromagnetic waves originating at points beyond the earth's atmosphere. In the embodiment wherein explosives are utilized, background measurements made at the surface are made at times prior to or between detonations.

In one embodiment, electromagnetic field measurements preferably are made within the frequency range of 10–100 cycles per second or less. Magnetometers for carrying out such measurements are manufactured and sold by Varian Associates, San Carlos, Calif. Somewhat similar devices have been manufactured by Texas Instruments, Inc., Dallas, Tex., and designated as "meta-stable helium magnetometers."

While the invention has been described in connection with certain embodiments thereof, it will be understood that certain modifications will suggest themselves to those skilled in the art, and it is intended to cover such modifications as fall within the scope of the appended claims.

What is claimed is:

1. A method of locating the plane of a horizontal interface region between a salt dome and adjacent subsurface formations of a different nature, comprising the steps of:

in the vicinity of said salt dome generating seismic disturbances which effect said salt dome, moving an electromagnetic energy detector to a plurality of depths in a borehole extending into subsurface formations in the close vicinity of said salt dome, at said depths detecting for electromagnetic signals resulting from the generation of said seismic disturbances, and recording the electromagnetic signals detected in correlation with depth to locate the plane of said horizontal interface region by an increase in amplitude of said electromagnetic signals at the level of said horizontal interface region.

2. The method of claim 1 wherein:

said detecting operations are carried out in a borehole spaced from said salt dome.

3. The method of claim 1 wherein:

seismic disturbances are repetitively generated and electromagnetic signals detected at different depths to obtain measurements associated with each seismic disturbance generated.

4. The method of claim 1 wherein:

said seismic disturbances are generated within a zone defined by the vertical projection of the outermost boundary of said salt dome onto a plane parallel with the earth's surface.

5. The method of claim 1 wherein:

said seismic disturbances are generated above said salt dome.

6. The method of claim 5 wherein:

said seismic disturbances are generated by detonating explosives.

7. The method of claim 1 wherein:

measurements are made at the surface for background electromagnetic signals to aid in interpreting said signals recorded.

8. The method of claim 3 wherein:

measurements are made at the surface for background electromagnetic signals to aid in interpreting said signals recorded, said background measurements being made during time periods between the generation of seismic disturbances.

References Cited

UNITED STATES PATENTS

| | | | |
|---|---|---|---|
| 1,923,107 | 8/1933 | McCollum | 181—5 |
| 1,934,079 | 11/1933 | Lundberg et al. | 324—7 X |
| 2,054,067 | 9/1936 | Blau et al. | 181—5 |
| 2,156,259 | 5/1939 | Blau | 324—1 X |
| 2,220,788 | 11/1940 | Lohman | 324—6 |
| 2,222,182 | 11/1940 | Mounce et al. | 324—1 |
| 2,599,687 | 6/1952 | Brant | 324—8 |
| 2,766,426 | 10/1956 | Wilhelm | 324—8 X |
| 2,931,974 | 4/1960 | McLaughlin et al. | 324—8 |
| 3,149,278 | 9/1964 | Cartier et al. | 324—8 X |

RUDOLPH V. ROLINEC, *Primary Examiner.*

WALTER L. CARLSON, *Examiner.*

G. R. STRECKER, *Assistant Examiner.*

UNITED STATES PATENT OFFICE
CERTIFICATE OF CORRECTION

Patent No. 3,392,327                                              July 9, 1968

John R. Zimmerman, Jr.

It is certified that error appears in the above identified patent and that said Letters Patent are hereby corrected as shown below:

In the heading to the printed specification, line 2, "ELECTROSEIMIC" should read -- ELECTROSEISMIC --. Column 3, line 12, before "drilling" insert -- out --.

Signed and sealed this 25th day of November 1969.

(SEAL)
Attest:

Edward M. Fletcher, Jr.                              WILLIAM E. SCHUYLER, JR.
Attesting Officer                                            Commissioner of Patents